United States Patent
Murray (10) Patent No.: US 11,224,239 B2
(45) Date of Patent: Jan. 18, 2022

(54) METHOD OF PREPARING HYDROGEN-ENRICHED WATER AND METHOD OF FILLING FLEXIBLE POUCHES WITH HYDROGEN-ENRICHED WATER

(71) Applicant: Pouch Pac Innovations, LLC, Sarasota, FL (US)

(72) Inventor: R. Charles Murray, Sarasota, FL (US)

(73) Assignee: Pouch Pac Innovations, LLC, Sarasota, FL (US)

( * ) Notice: Subject to any disclaimer, the term of this patent is extended or adjusted under 35 U.S.C. 154(b) by 0 days.

(21) Appl. No.: 15/499,237

(22) Filed: Apr. 27, 2017

(65) Prior Publication Data
US 2017/0311631 A1  Nov. 2, 2017

Related U.S. Application Data (60) Provisional application No. 62/328,324, filed on Apr. 27, 2016.

(51) Int. Cl.
*A23L 2/54* (2006.01)
*A23L 2/74* (2006.01)
(Continued)

(52) U.S. Cl.
CPC .................. *A23L 2/54* (2013.01); *A23L 2/74* (2013.01); *B65B 3/045* (2013.01); *B65B 7/02* (2013.01); *B65B 39/12* (2013.01); *B65B 55/08* (2013.01); *B65B 55/10* (2013.01); *B65B 61/025* (2013.01); *C02F 9/00* (2013.01); *A23V 2002/00* (2013.01); *A23V 2250/12* (2013.01); *C02F 1/20* (2013.01);
(Continued)

(58) Field of Classification Search
None
See application file for complete search history.

(56) References Cited

U.S. PATENT DOCUMENTS

| 3,834,430 | A  | * | 9/1974 | Fechheimer | B67C 3/16 141/119 |
| 6,241,122 | B1 | * | 6/2001 | Araki | B65D 47/06 222/107 |
| 2005/0224996 | A1 | * | 10/2005 | Yoshida | C02F 1/70 261/76 |
| 2005/0271306 | A1 | * | 12/2005 | Murray | B29C 65/08 383/38 |

(Continued)

OTHER PUBLICATIONS

Brain: How Thermoses (Vacuum Flasks) Work; published online at least by Mar. 22, 2016 at: https://web.archive.org/web/20160322143920/http://home.howstuffworks.com/thermos.htm/printable (Year: 2016).*

(Continued)

*Primary Examiner* — Patricia A George
(74) *Attorney, Agent, or Firm* — Dinsmore & Shohl LLP (57) ABSTRACT

A process of producing hydrogen water includes the steps of: cooling water to a temperature where hydrogens atoms of the water molecule expand a space between the hydrogen atoms and contacting the cooled water with hydrogen gas wherein hydrogen atoms of the hydrogen gas are positioned in the space of the expanded hydrogen atoms of the water molecule and then heating the water trapping the hydrogen atoms of the hydrogen gas in the space wherein the hydrogen water has a hydrogen content of from 3 to 10 parts per million. The hydrogen water may be filled into pouches with hydrogen water in the pouch having a hydrogen content of from 1.7 to 4 parts per million.

4 Claims, 6 Drawing Sheets

(51) Int. Cl.
- *B65B 3/04* (2006.01)
- *B65B 39/12* (2006.01)
- *B65B 7/02* (2006.01)
- *B65B 61/02* (2006.01)
- *B65B 55/10* (2006.01)
- *B65B 55/08* (2006.01)
- *C02F 9/00* (2006.01)
- *C02F 1/68* (2006.01)
- *C02F 1/44* (2006.01)
- *C02F 1/20* (2006.01)
- *C02F 103/02* (2006.01)
- *C02F 1/28* (2006.01)
- *C02F 1/32* (2006.01)

(52) U.S. Cl.
CPC .............. *C02F 1/283* (2013.01); *C02F 1/32* (2013.01); *C02F 1/441* (2013.01); *C02F 1/68* (2013.01); *C02F 2103/026* (2013.01)

(56) References Cited

U.S. PATENT DOCUMENTS

| | | | |
|---|---|---|---|
| 2010/0276450 A1* | 11/2010 | Fergusson | B65B 9/213 222/105 |
| 2011/0198236 A1* | 8/2011 | Sumita | B01D 61/025 205/746 |
| 2016/0176584 A1* | 6/2016 | Ishihara | B65D 35/02 493/243 |
| 2016/0185517 A1* | 6/2016 | Matsumoto | B65D 75/5883 426/66 |
| 2016/0249668 A1* | 9/2016 | Igarashi | A23F 3/163 426/72 |
| 2017/0080022 A1* | 3/2017 | Levy | A61K 33/00 |

OTHER PUBLICATIONS

Takanoba: JP,2016-074223,A; published May 12, 2016. (Year: 2016).*

* cited by examiner

# METHOD OF PREPARING HYDROGEN-ENRICHED WATER AND METHOD OF FILLING FLEXIBLE POUCHES WITH HYDROGEN-ENRICHED WATER

CROSS-REFERENCE TO RELATED APPLICATIONS

This application claims the benefit of U.S. Provisional Application 62/328,324 filed on Apr. 27, 2016 and is hereby incorporated by reference.

FIELD OF THE INVENTION

The invention relates to a process of producing hydrogen water and a process of filling a pouch with hydrogen water.

BACKGROUND OF THE INVENTION

Hydrogen-enriched water is being produced as a drinking product. Hydrogen is diffused through drinking water and is captured in spaces between the molecules of the water. Simple diffusion may result in a maximum of around 3 parts per million of hydrogen to water. However, hydrogen is quite light and will migrate from between the water molecules quite easily. Additionally, hydrogen will react with any oxygen that is present to produce water. Accordingly, filling of hydrogen water into containers such as flexible pouches must be carefully done in order to maintain hydrogen within the water and maintain a long shelf life for the product.

SUMMARY OF THE INVENTION

In one aspect, there is disclosed a process of producing hydrogen water comprising the steps of: providing a source of water; cooling the water to a temperature of from 33 to 45 degrees F.; diffusing hydrogen gas into the cooled water; returning the water to higher temperature than the cooled water forming hydrogen water having a hydrogen content of from 3 to 10 parts per million.

In another aspect, there is disclosed a process of producing hydrogen water comprising the steps of: cooling water to a temperature where hydrogens atoms of the water molecule expand a space between the hydrogen atoms and contacting the cooled water with hydrogen gas wherein hydrogen atoms of the hydrogen gas are positioned in the space of the expanded hydrogen atoms of the water molecule and then heating the water trapping the hydrogen atoms of the hydrogen gas in the space wherein the hydrogen water has a hydrogen content of from 3 to 10 parts per million.

In a further aspect, there is disclosed a process of producing hydrogen water comprising the steps of: providing a source of water; cooling the water to a temperature of from 33 to 45 degrees F.; diffusing hydrogen gas into the cooled water; returning the water to higher temperature than the cooled water forming hydrogen water having a hydrogen content of from 3 to 10 parts per million; filling a pouch with the formed hydrogen water. The hydrogen water in the pouch has a hydrogen content of from 1.7 to 4 parts per million.

DETAILED DESCRIPTION OF THE PREFERRED EMBODIMENTS

1. Method for Producing Hydrogen Enriched Water

Figure 1:
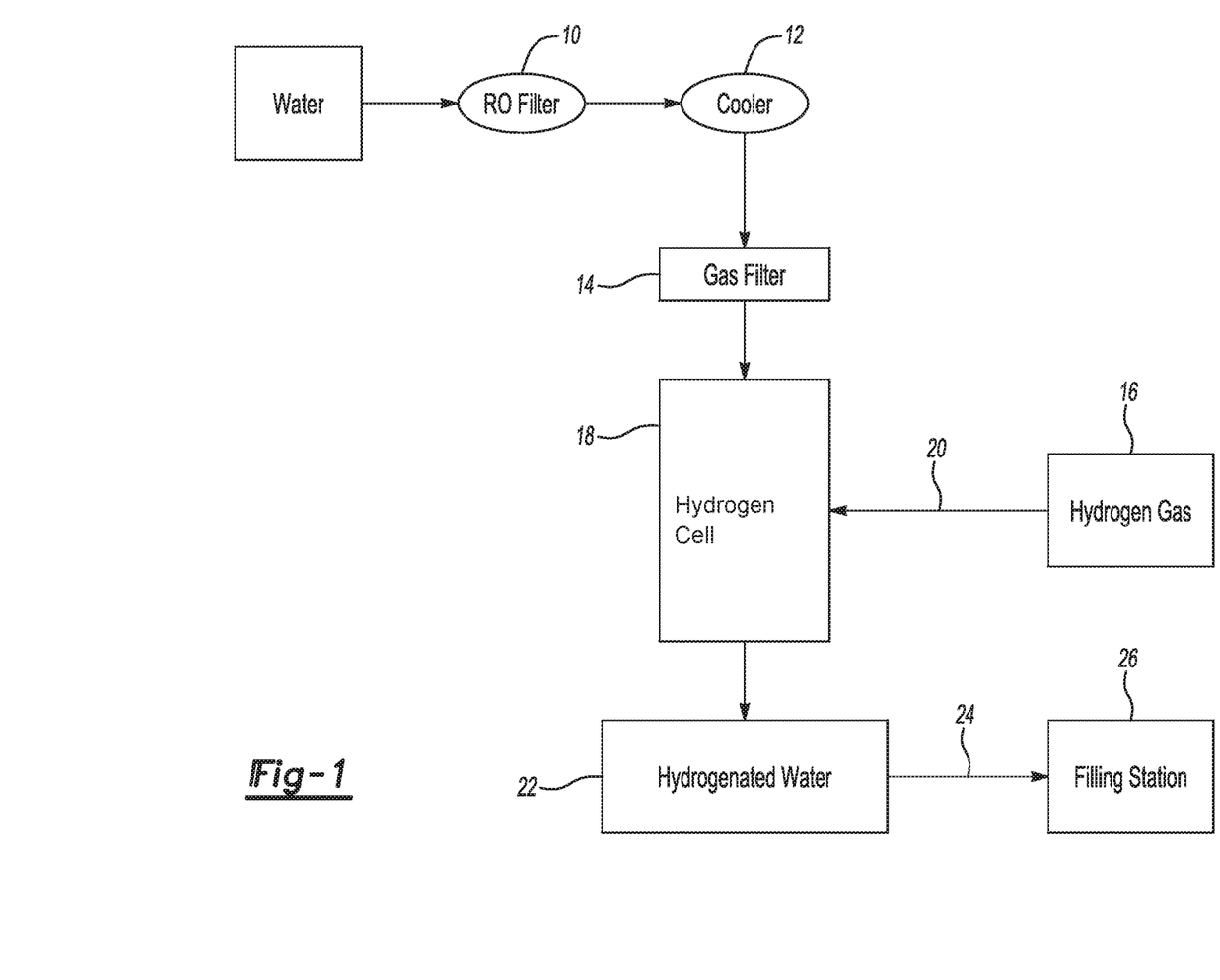
FIG. 1 is flow diagram of the process of producing hydrogen water.

An improved method for producing hydrogen-enriched water is shown in FIG. 1. The method includes the steps of filtering water 10 to remove impurities including filtering by reverse osmosis and removal of any gas in a water feed stream. The water is then cooled 12 to a temperature less than ambient such as from 33 to 45 degrees F. The cooled water may contact a gas filter 14 to remove unwanted gases from the feed stream. The cooled water is then contacted with an ultra-pure hydrogen gas 16. The contact may be in a liquid hydrogen cell 18. The hydrogen 20 is diffused into the water resulting in a greatly enhanced presence of hydrogen in the water in the range of greater than 3 to 10 parts per million in the water. Following the diffusion, the hydrogenated water 22 is allowed to heat to a higher temperature. In one aspect, the hydrogenated water 22 may be distributed through a stabilization path 24 before introduction into a pouch at a filling station 26. The stabilizing path may have a length allowing sufficient exposure time to allow hydrogen to be retained in the space between hydrogen atoms of the water molecule. Additionally, the stabilization path may be held at room temperature such that the water in the path is allowed to increase from 4 to 5 degrees F. from the cooled state.

While not being bound by theory, it is believed that the cooling of the water prior to contact with hydrogen expands the space between hydrogen atoms in the water molecule allowing hydrogen atoms of the hydrogen gas to be positioned in the space between the water hydrogen atoms. Allowing the water to then heat to a higher temperature shrinks the space between the hydrogen atoms in the water molecule trapping the hydrogen and allowing for the unexpected high parts per million of hydrogen (3 to 10) in the hydrogenated water with a subsequent stability for an extended period of time, such as from 2 to 12 months.

2. Method of Filling

Figure 2:
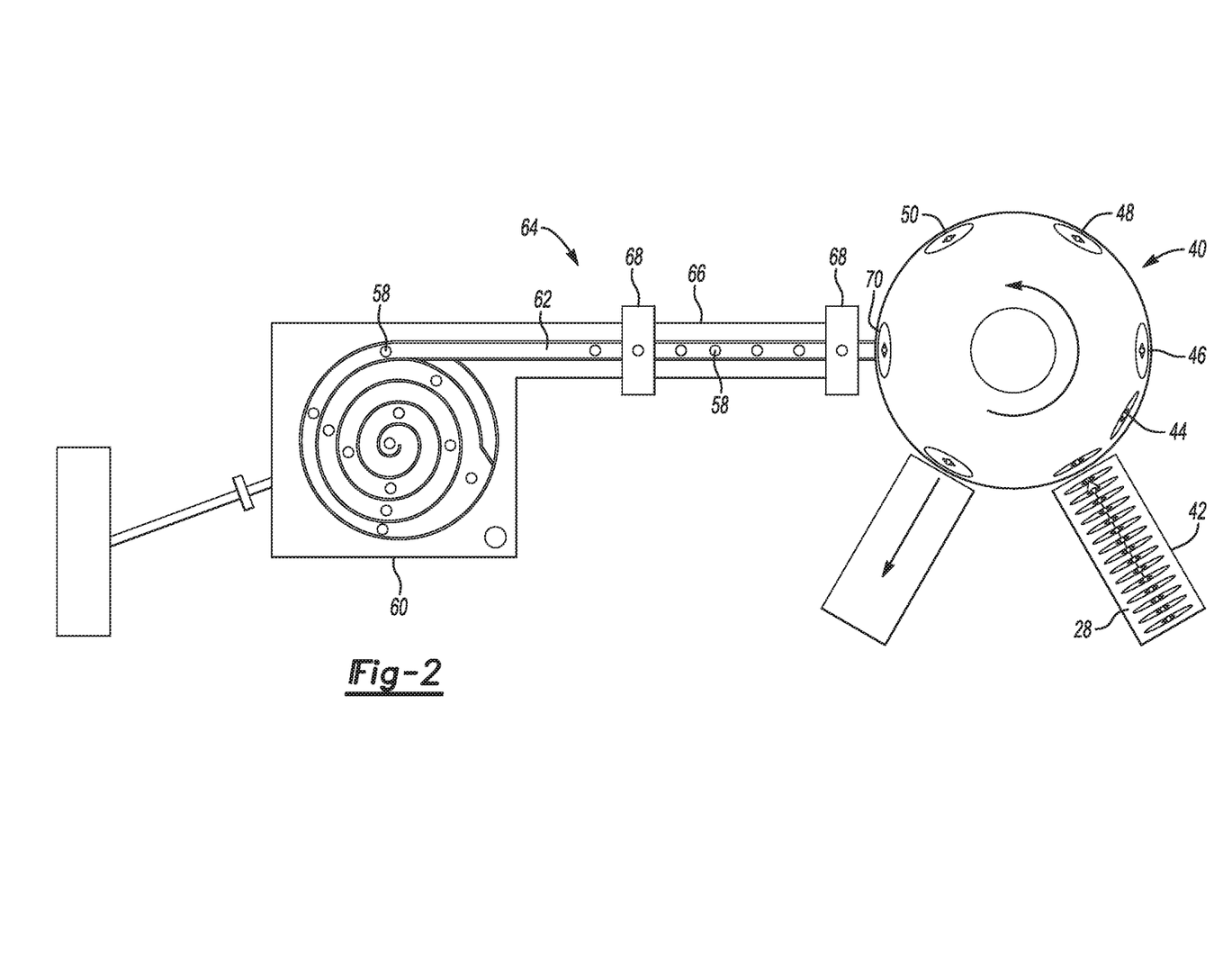
FIG. 2 is a diagram of a filling process for filling pouches with hydrogen water.
Figure 3:
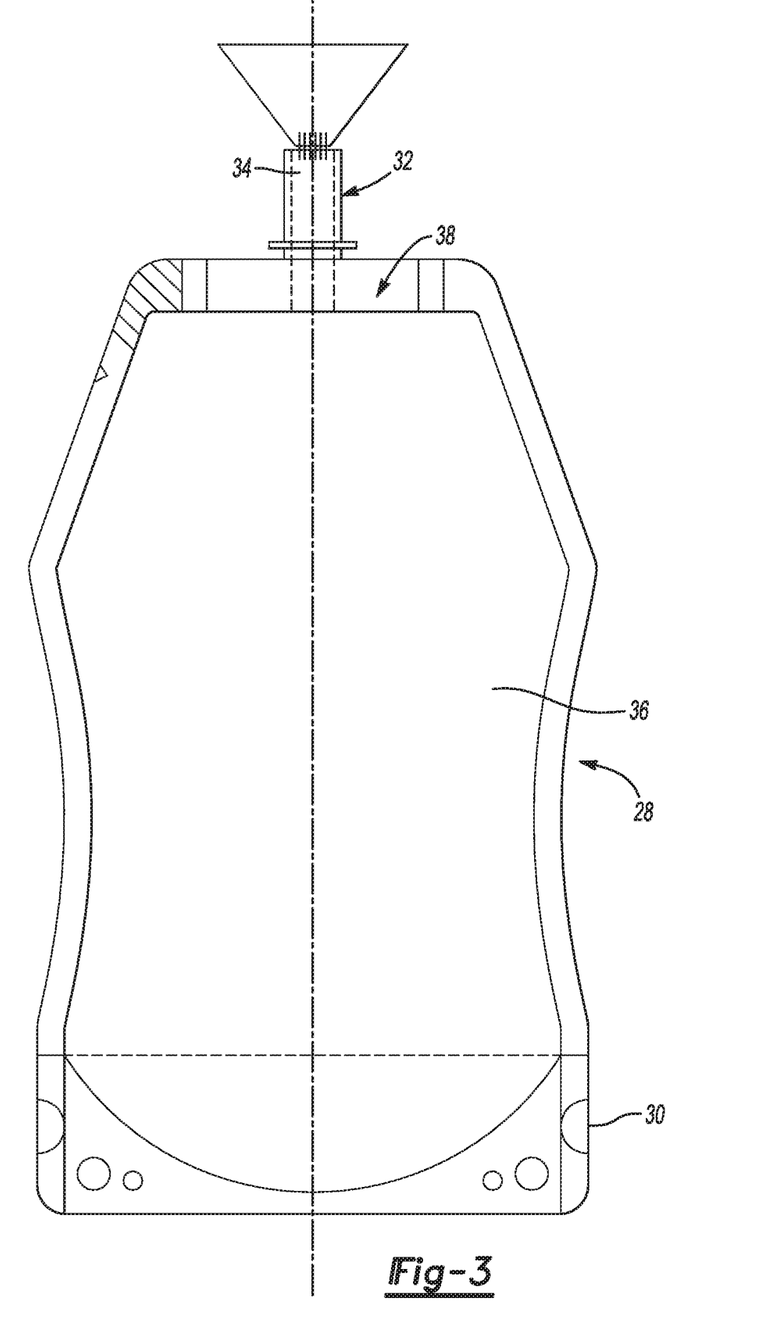
FIG. 3 is diagram of a pouch at a sterilization station.

A method of filling containers such as flexible plastic foil laminate pouches or paper pouches with hydrogen water is shown in FIG. 2. The pouches 28 may be formed from panels of flexible plastic/foil laminate. Although shown with respect to a stand up pouch with a bottom gusset 30, the method may be used with any type of container having a fitment 32 with a spout 34 and flexible walls 36. The pouches 28 are formed in a conventional manner and a fitment 32 is mounted between the top edges 38 of the pouch 28. As shown in FIG. 2, the pouches 28 are loaded onto a turret 40 at a first station 42. The pouches 28 are date coded at a second station 44. The pouch 28 is opened at a third station 46 and sterilized at a fourth station 48. As shown in FIG. 3, the pouch 28 may be sterilized by dry steam or infrared radiation or hydrogen peroxide gas.

Figure 4:
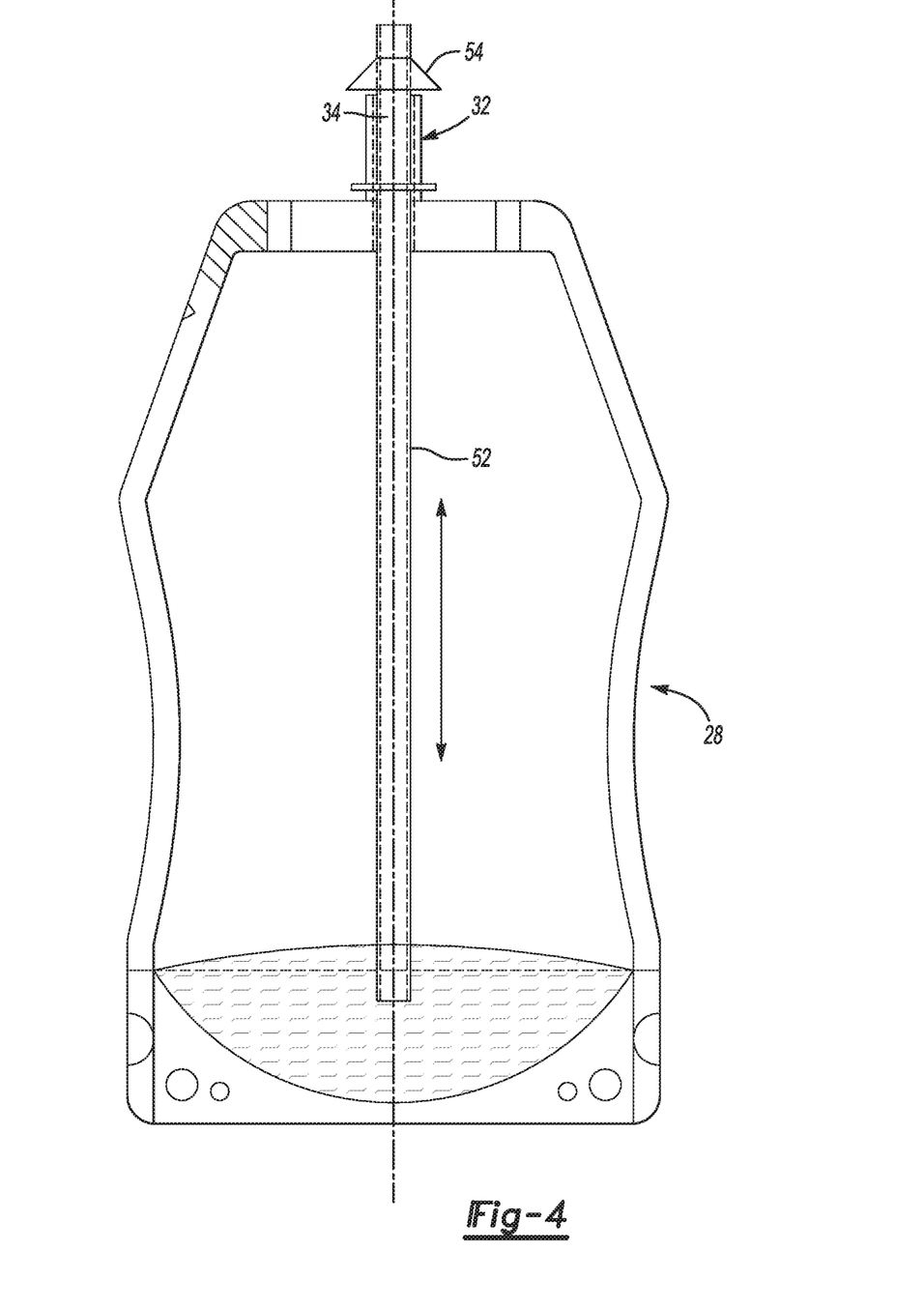
FIG. 4 is a diagram of a pouch at a filling station.

At the filling station 50, as shown at FIG. 4, a diving filling tube 52 is moved downwardly through a hood 54 and through the spout 34 of the fitment 32. The filling tube 52 is positioned approximately ½ inch from the bottom of the pouch 28. The hydrogen-enriched water is then delivered from a reservoir through the filling tube 52 to the bottom of the pouch 28. The filling tube 52 is held in this position until the hydrogen-enriched water rises approximately ⅛ inch over the bottom edge of the filling tube 52. The filling tube 52 is then raised at a rate which keeps the bottom edge of the filling tube 52 submersed beneath the level of the water so as to minimize turbulence. Turbulence from hydrogen-enriched water entering the pouch 28 through the filling tube 52 may result in dislodgement of the hydrogen molecules from between the water molecules. Thus, it is desirable to minimize the turbulence. The pouch 28 is filled to the very top of the spout 34 so that a meniscus is formed at the top of the spout 34.

The pouch is then moved to the capping station 50 as shown in FIG. 2. The caps 58 are delivered to the station from a bowl feeder 60 through a delivery tube 62. The bowl feeder 60 is housed in a chamber which is filled with hydrogen to prevent oxygen from contaminating the caps 58. The caps 58 are then fed through a sterilizing passage 64. The sterilizing passage 64 has a center hydrogen peroxide gas chamber 66 positioned between two hot air chambers 68. The hot air chambers 68 keep the hydrogen peroxide gas from escaping. The caps 58 are sterilized as they pass through the hydrogen peroxide gas. At the end of the sterilization passage 64, the cap 58 is taken from the passage by a robotic arm 70 to be twisted onto the spout 34.

Figure 5:
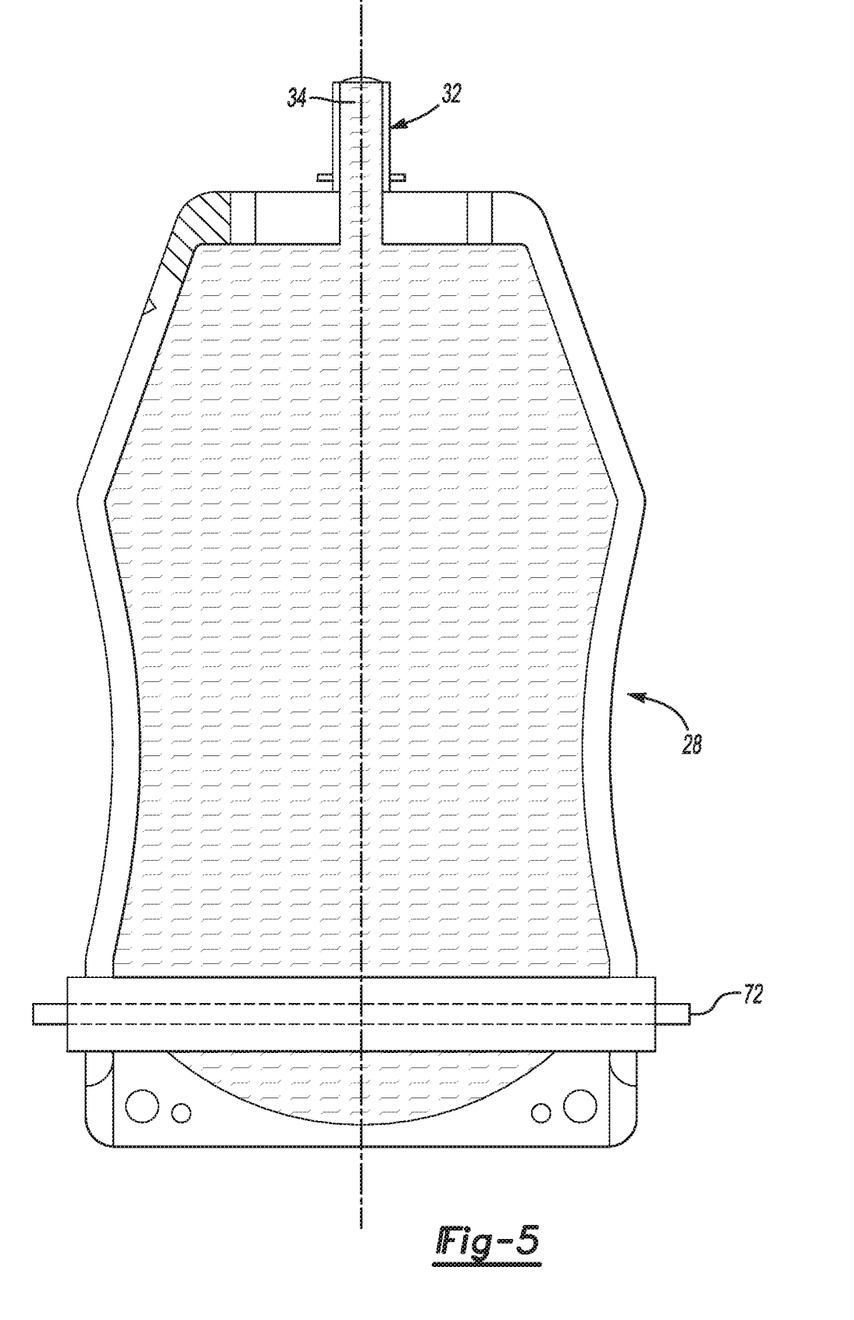
FIG. 5 is a diagram of a pouch at a filling station using a roller.
Figure 6:
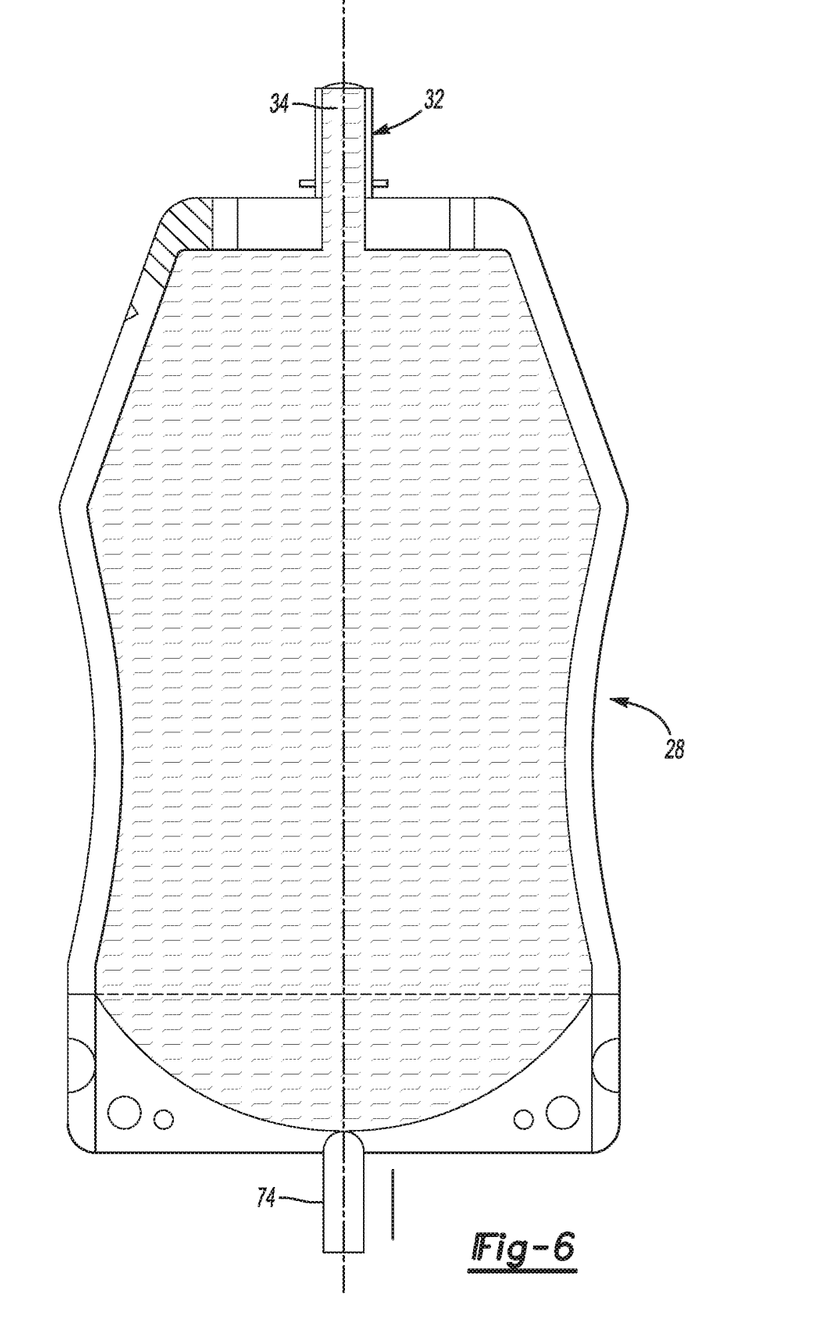
FIG. 6 is a diagram of a pouch at a filling station using a ram.

As shown in FIG. 5, just before the cap 58 is threaded onto the spout 34, a rubber roller 72 may be pressed against the lower part of the pouch 28 and a backing plate to force a small amount of liquid out of the pouch 28 thereby eliminating any oxygen and liquid contaminated by the oxygen from the spout 34. The cap 58 then is lowered and threaded downwardly on the spout 34 by the robotic arm 70. Alternatively, as shown in FIG. 6, a pneumatic ram 74 may be utilized such that it extends into the bottom of the pouch 28 to expel water from the spout 34.

EXAMPLES

Example 1

A system including water storage tank having a sanitizing apparatus including a transfer pump and water heater is provided. The sanitizing system may be utilized to maintain the equipment at proper levels of sanitation between operating cycles. Water flows from a source such as a city water source to a filtration system that includes a carbon filter and a reverse osmosis system that utilizes a 4.5×20 5 micro sediment filter with 4 membranes. The filtered water may then be stored in the storage tank for use in the process. A pump moves filtered water at a flow rate of approximately 20 liters per minute from the storage tank. Additional sanitizing elements such as UV lights may be applied to the lines following the storage tank. The water may enter a 0.02 micron filter and a vacuum to remove gases from the water feed stream. The water is then cooled to a desired lower temperature such as between 33 and 45 degrees F. using a cooling mechanism. The water then enters 2 liquid hydrogen cells. A hydrogen gas source such as a hydrogen tank is coupled to the hydrogen cells. Hydrogen gas exits the hydrogen tank through a standard 1 inch valve into the hydrogen cells and bubbles into the flowing water. The hydrogen gas diffuses into the cooled water and exits the hydrogen cell into the stabilization path. The stabilization path may include a hose that is maintained at ambient temperature. The hose includes a length such that it allows sufficient time for diffusion of the hydrogen and also allows for the water to return to a higher temperature such as between 4 and 5 degrees higher than the cooled water temperature. In one aspect the stabilizing path may include a 100 foot hose having a one inch diameter.

Following the stabilization path, the hydrogen water is then filled into pouches as described above.

Example 2

Hydrogen water was produced in the system as described in example 1. The temperature of the water is lowered to 33 to 34 degrees F. Hydrogen measurements were made at three points in the process: A) at the exit of the hydrogen stabilization line B) at the filling station and C) in the pouch after filling.

| A (ppm hydrogen) | B (ppm hydrogen) | C (ppm hydrogen) |
| --- | --- | --- |
| 10 | 8 | 4 |

As can be seen from the above, the process provides unexpectedly high hydrogen content to the cooled water (10 ppm) and provides hydrogen water in a pouch with high hydrogen content (4 ppm) that is stable for up to 12 months.

Example 3

Hydrogen water was produced in the system as described in example 1. The temperature of the water is lowered to 38 to 45 degrees F. Hydrogen measurements were made at three points in the process: A) at the exit of the hydrogen stabilization line B) at the filling station and C) in the pouch after filling.

| A (ppm hydrogen) | B (ppm hydrogen) | C (ppm hydrogen) |
| --- | --- | --- |
| 4 | 2-3 | 1.7 |

As can be seen from the above, the process provides unexpectedly high hydrogen content to the cooled water (4 ppm) and provides hydrogen water in a pouch with high hydrogen content (1.7 ppm) that is stable for up to 12 months.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A process of producing a packaged hydrogen water comprising the steps of:
  cooling water to a temperature where hydrogens atoms of the water molecule expand a space between the hydrogen atoms;
  contacting the cooled water with hydrogen gas wherein hydrogen atoms of the hydrogen gas are positioned in the space of the expanded hydrogen atoms of the water molecule; and then
  heating the water trapping the hydrogen atoms of the hydrogen gas in the space wherein the hydrogen water has a hydrogen content of from 3 to 10 parts per million and wherein the hydrogen water is stable for up to 12 months.

2. The process of claim 1 including a step of removing gas from the water prior to diffusing hydrogen into the water and filtering the water prior to cooling.

3. The process of claim 1 including a step of stabilizing the hydrogen water following the step of diffusing hydrogen gas wherein the stabilization step includes flowing the water through a path to return the water to a higher temperature of between 4 and 5 degrees F. higher relative to the cooled water temperature.

4. The process of claim 1 including a step of filling a pouch with the formed hydrogen water wherein the hydrogen water in the pouch has a hydrogen content of from 1.7 to 4 parts per million.

\* \* \* \* \*